US009694852B2

(12) United States Patent
Matsuoka

(10) Patent No.: US 9,694,852 B2
(45) Date of Patent: Jul. 4, 2017

(54) VEHICLE STOP CONTROL DEVICE

(71) Applicant: Daisuke Matsuoka, Iwata (JP)

(72) Inventor: Daisuke Matsuoka, Iwata (JP)

(73) Assignee: NTN CORPORATION, Osaka (JP)

( * ) Notice: Subject to any disclaimer, the term of this patent is extended or adjusted under 35 U.S.C. 154(b) by 113 days.

(21) Appl. No.: 14/875,057

(22) Filed: Oct. 5, 2015

(65) Prior Publication Data

US 2016/0023679 A1 Jan. 28, 2016

Related U.S. Application Data

(63) Continuation of application No. PCT/JP2014/057194, filed on Mar. 17, 2014.

(30) Foreign Application Priority Data

Apr. 5, 2013 (JP) .................................. 2013-079283

(51) Int. Cl.
*B62D 6/00* (2006.01)
*B62D 17/00* (2006.01)
(Continued)

(52) U.S. Cl.
CPC ................ *B62D 17/00* (2013.01); *B60T 1/12* (2013.01); *B62D 6/002* (2013.01); *B62D 7/1509* (2013.01);
(Continued)

(58) Field of Classification Search
CPC .......... B62D 17/00; B62D 6/00; B62D 6/002; B62D 5/006; B62D 7/18; B62D 7/20
(Continued)

(56) References Cited

U.S. PATENT DOCUMENTS

| 8,701,801 B2 | 4/2014 | Itou et al. |
| 2003/0226727 A1* | 12/2003 | Laurent ..................... B60T 1/12 |
| | | 188/265 |

(Continued)

FOREIGN PATENT DOCUMENTS

| CN | 102933452 A | 2/2013 |
| JP | 2-189281 | 7/1990 |

(Continued)

OTHER PUBLICATIONS

International Search Report mailed Jun. 10, 2014, in corresponding International Application No. PCT/JP2014/057194.
(Continued)

*Primary Examiner* — Thomas G Black
*Assistant Examiner* — Luke Huynh

(57) ABSTRACT

The vehicle stop control device includes a normal-state turning control unit to output, to turning devices, a turning amount command value defined by a steering amount signal inputted from steering input device to input steering angles of wheels, and a stopped-state turning control unit to detect a vehicle speed based on a rotation angle signal outputted from a rotation angle sensor, and to, when the detected vehicle speed is less than or equal to a threshold and an accelerator input value is less than or equal to a threshold, perform hill hold of a vehicle capable of independently turning all wheels with the turning device 4 of one or more of the wheels turning the corresponding wheel toward a toe-in or toe-out side by an amount greater than the turning amount command value from the normal-state turning control unit.

6 Claims, 7 Drawing Sheets

(51) Int. Cl.
*B60T 1/12* (2006.01)
*B62D 9/00* (2006.01)
*B62D 7/15* (2006.01)
*F16D 63/00* (2006.01)

(52) U.S. Cl.
CPC ............... *B62D 9/00* (2013.01); *F16D 63/00* (2013.01); *B60T 2201/06* (2013.01)

(58) Field of Classification Search
USPC ................. 701/41, 42; 180/411; 188/265
See application file for complete search history.

(56) References Cited

U.S. PATENT DOCUMENTS

| | | | |
|---|---|---|---|
| 2009/0178876 A1* | 7/2009 | Miki ................. | B62D 7/142 180/411 |
| 2012/0277956 A1* | 11/2012 | Sasaki ............... | B62D 7/159 701/41 |
| 2013/0098695 A1 | 4/2013 | Itou et al. | |
| 2015/0151778 A1* | 6/2015 | Kageyama ........... | B60G 3/20 701/41 |

FOREIGN PATENT DOCUMENTS

| | | |
|---|---|---|
| JP | 5-252612 | 9/1993 |
| JP | 11-229917 | 8/1999 |
| JP | 2007-145253 | 6/2007 |
| JP | 2007-237838 | 9/2007 |
| JP | 2012-91687 | 5/2012 |
| WO | WO 2006/114977 A1 | 2/2006 |
| WO | WO 2007/119298 A1 | 10/2007 |

OTHER PUBLICATIONS

Chinese Office Action dated Sep. 2, 2016 in corresponding Chinese Patent Application No. 201480017871.2.
PCT International Preliminary Report on Patentability dated Oct. 15, 2015 in corresponding International Patent Application No. PCT/JP2014/057194.
Japanese Office Action dated Feb. 7, 2017 in corresponding Japanese Patent Application No. 2013-079283.
Extended European Search Report dated Oct. 6, 2016 in corresponding European Patent Application No. 14778485.4.

* cited by examiner (A)

(B)

TURN ONLY RIGHT FRONT WHEEL

TOE-IN ALL WHEELS

TOE-IN ONLY FRONT WHEELS

NORMAL STATE DURING TURNING

TOE-IN ONLY RIGHT FRONT WHEEL
(DURING TURNING)

TOE-IN ONLY FRONT WHEELS
(DURING TURNING)

VEHICLE STOP CONTROL DEVICE

CROSS REFERENCE TO THE RELATED APPLICATION

This application is a continuation application, under 35 U.S.C. §111(a), of international application No. PCT/JP2014/057194, filed Mar. 17, 2014, which is based on and claims Convention priority to Japanese patent application No. 2013-079283, filed Apr. 5, 2013, the entire disclosure of which is herein incorporated by reference as a part of this application.

BACKGROUND OF THE INVENTION

Field of the Invention

The present invention relates to a vehicle stop control device configured to prevent unintended backward movement or the like of a vehicle in which all wheels are capable of being independently turned and driven wheels are capable of being independently driven to travel.

Description of Related Art

For example, a parking brake is used to prevent a vehicle from moving backward while the vehicle is stopped.

In recent years, techniques have been proposed for applying an appropriate braking force to the vehicle by a control device according to the conditions (e.g., the inclination gradient of a downhill road) of the vehicle.

One of such examples is a technique for determining the magnitude of the inclination gradient of a downhill road by using detection results obtained from a tilt angle sensor, map data, images captured by an onboard camera, or a sensor device such as a millimeter-wave radar device, and for applying a toe angle in the toe-in direction or toe-out direction to the wheels, thereby braking the vehicle (proposed in Patent Document 1).

RELATED DOCUMENT

Patent Document

[Patent Document 1] JP Laid-open Patent Publication No. 2007-145253

Techniques using a parking brake for temporarily stopping the vehicle cause some trouble or labor to the driver and require complex operations.

Conventional techniques using control devices perform control by using GPS information, a G sensor, a millimeter-wave radar device, an onboard camera or the like, and thus have a complex mechanism.

SUMMARY OF THE INVENTION

It is an object of the invention to provide a vehicle stop control device that can improve the operability in performing hill-hold of a vehicle capable of independently turning all wheels, while simplifying the structure and thus reducing the manufacturing cost.

Hereinafter, the present invention will be described with reference to the reference numerals used for embodiments for convenience to facilitate understanding.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
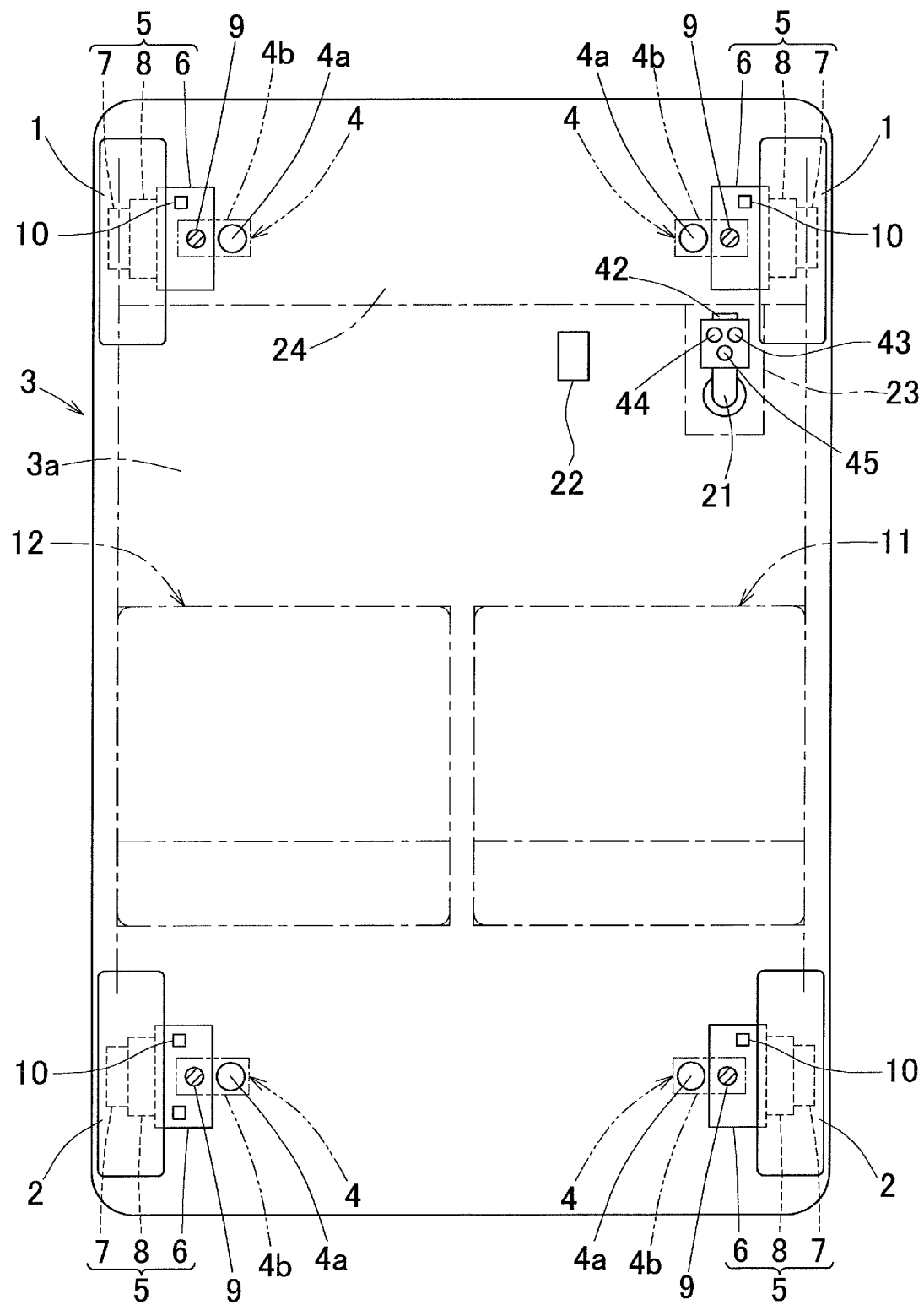
FIG. 1 is an explanatory plan view illustrating the arrangement of various parts of a vehicle according to a first embodiment of the present invention.

A first embodiment of the present invention will now be described with reference to FIGS. 1 to 7. Referring to FIG.

1, a vehicle according to the present embodiment is an electric car including two left and right wheels 1, 1 serving as front wheels and two left and right wheels 2, 2 serving as rear wheels. All the wheels 1 and 2 are each provided with a turning device 4 which allows independent turning of its corresponding wheel. In the example shown, the wheels 1, 2 are all driven wheels that are each independently driven to travel by a corresponding traveling drive mechanism 5 including a drive source 6.

In this example, the traveling drive mechanism 5 is an in-wheel motor drive device including a wheel bearing 7 supporting the corresponding wheel 1, 2, a motor 6 serving as a drive source, and a reduction gear or a speed reducer 8 for reducing the speed of the rotation outputted from the motor 6 and transmitting the rotation to a rotation bearing ring (not shown) of the wheel bearing 7. The traveling drive mechanism 5 is an integrated unit in which the wheel bearing 7, the motor 6, and the speed reducer 8 are provided in a common housing, or in which these components are coupled to each other. The integrated traveling drive mechanism 5 is provided via a suspension (not shown) in a vehicle body 3 so as to be rotatable about a vertically extending support shaft 9. The motor 6 includes a rotation angle sensor 10 that outputs a rotation angle signal of a rotor (not shown) of the motor. An inverter device, which will be described later, acquires a rotation angle signal from the rotation angle sensor 10, and performs control according to the rotation angle such as vector control.

The turning device 4 includes a turning drive source 4a including an electric motor or the like, and a transmission mechanism 4b for transmitting the rotation of the turning drive source 4a to the traveling drive mechanism 5. The transmission mechanism 4b includes a gear train, for example. The turning device 4 of this example uses a steer-by-wire system that is not mechanically linked with the joystick 21 serving as steering input device. Apart from this, the transmission mechanism 4b may be a combination of rotation-rectilinear motion converter such as gears and ball screws, a rack-pinion mechanism and the like.

Figure 3A:
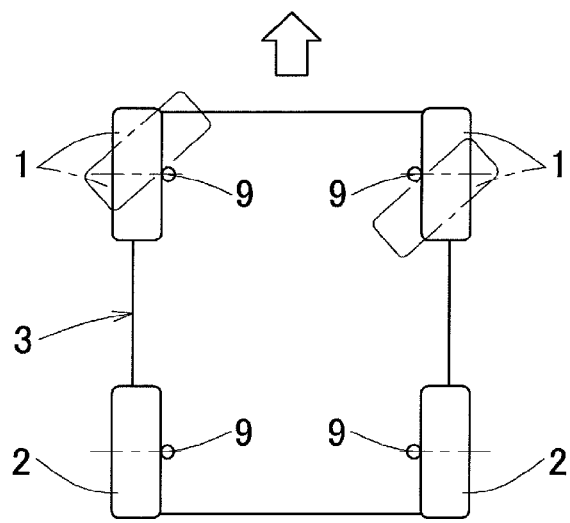
FIG. 3A is an explanatory plan view illustrating an operation in a normal traveling mode of the vehicle.
Figure 3B:
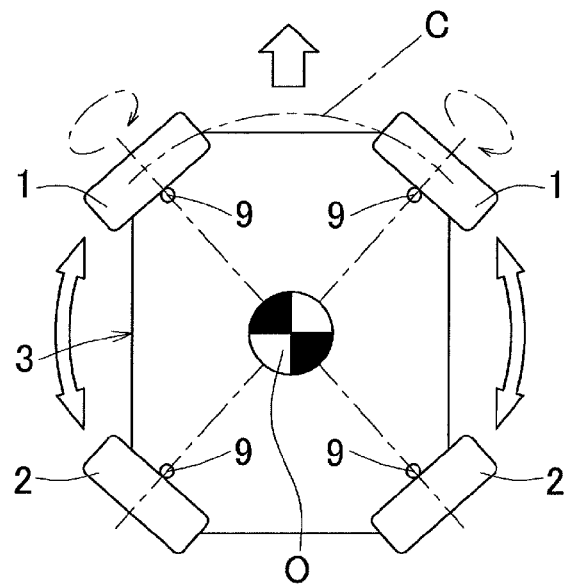
FIG. 3B is an explanatory plan view illustrating an operation in a pinwheeling mode of the vehicle.
Figure 3C:
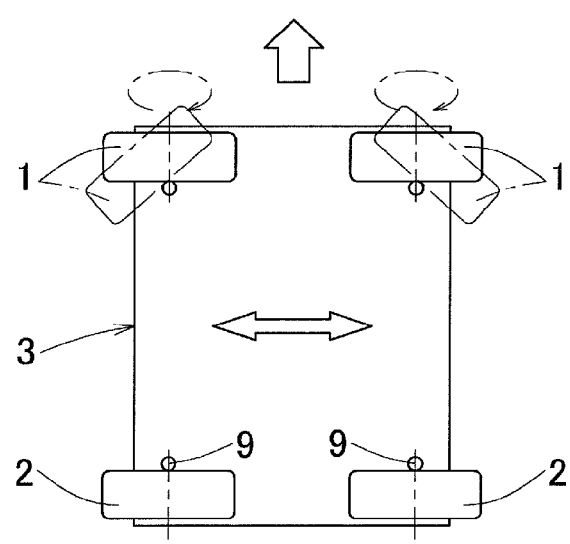
FIG. 3C is an explanatory plan view illustrating an operation in a lateral movement mode of the vehicle.

This electric car can move in a normal traveling mode shown in FIG. 3A and in an abnormal traveling mode, which is a pinwheeling mode shown in FIG. 3B or a lateral movement mode shown in FIG. 3C, by a configuration in which all the wheels 1, 2 are each provided with a turning device 4 for allowing independent turning of its corresponding wheel, and a configuration in which all the driven wheels 1, 2 are each capable of being independently driven.

The normal traveling mode shown in FIG. 3A includes normal straight traveling and traveling in the curving direction of an arc-shaped curve, and is a traveling mode other than the abnormal traveling modes, which are the pinwheeling mode and the lateral movement mode described below. In the normal traveling mode, the left and right wheels 1, 1, 2, 2 are turned in the same direction.

The pinwheeling mode shown in FIG. 3B is a movement mode in which the vehicle body 3 is pinwheeling, or is substantially turned about the center thereof as the center of rotation (with the radius of gyration being substantially zero). Specifically, the pinwheeling mode is a movement mode in which the wheels 1, 2 are aligned in a direction along a common imaginary circumference C, or in other words, in a tangential direction, and the wheels 1, 2 are respectively driven to be rotated in the same direction when seen from the center O of the circumference C, as indicated by curving single dotted arrows in FIG. 3B. Accordingly, the left and right wheels 1, 1 or 2, 2 are turned from the straight traveling direction to opposite directions to each other. In the pinwheeling mode, this vehicle can be gyrated to either leftward or rightward by switching the respective rotational direction of the wheels 1, 2 between forward and reverse directions.

The lateral movement mode shown in FIG. 3C is a movement mode in which the vehicle body 3 is moved directly sideways or substantially directly sideways. Specifically, the lateral movement mode is a mode in which the wheels 1, 2 are laterally oriented with respect to the vehicle body 3, and the wheels 1, 2 serving as the driven wheels are rotated so as to roll in the same lateral direction. The operation of changing the mode from the straight traveling state in the normal traveling mode to the lateral movement mode may vary depending on the configuration of the turning device 4. In this example, the wheels 1, 1 are oriented directly sideways, rather than by simply increasing the turning angle, but by turning the left and right wheels 1, 1 in opposite directions such that they are line-symmetrical with each other, as shown in the state in the process of turning for the wheels 1 on the front side by rectangles indicated by single dotted line in FIG. 3C. The same applies to the wheels 2, 2 on the rear side. In the case of laterally moving the vehicle by turning the wheels in this way, the front wheels 1, 1 and rear wheels 2, 2 are driven to be rotated in opposite directions to each other when the wheels 1, 2 serving as the driven wheels are rotated so as to roll in the same lateral direction.

Referring to FIG. 1, a driving operation system will be described. In a compartment 3a of the vehicle body 3, seats serving as a driver's seat 11 and a passenger's seat 12 are provided. As the driving operation system, a joystick 21 serving both as steering input device and accelerator operation device and a brake operation device 22 are provided. For example, the brake operation device 22 includes a brake pedal or the like, and is provided on the floor in front of the driver's seat 11.

Figure 4:
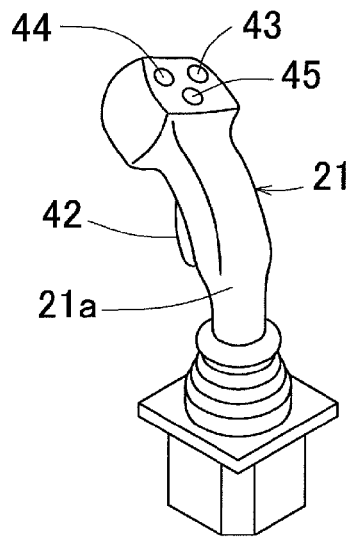
FIG. 4 shows a perspective view of an example of a joystick and an explanatory view of the function thereof.
Figure 4:
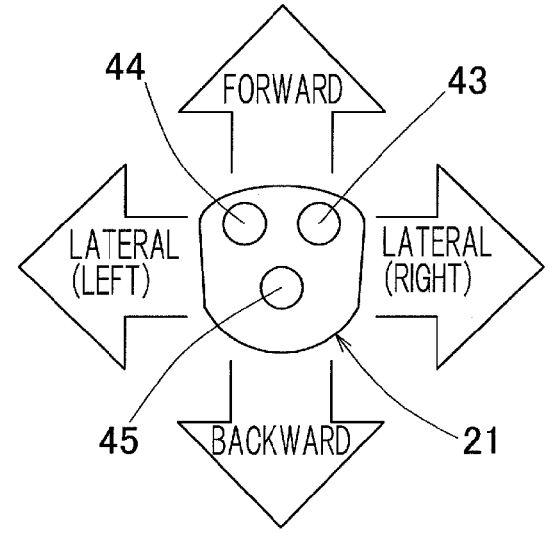

The joystick 21 is a generic term for steering input device for allowing input of the steering angle of wheels, for example, input of both the direction and the operation amount, by means of a single operation device manipulated by the driver. For example, a lever-type joystick 21 as shown in FIG. 4 can be adopted. The joystick 21 can be tilted in any direction in 360° around the entire circumference, from an upright state in which a lever 21a serving as an operation device is in a neutral position. The accelerator operation and the tilt direction of the turning operation vary for each of the modes described below.

Normal Traveling Mode

The front-back direction operation of the joystick corresponds to the accelerator operation amount of the forward or backward movement of an electric car. The operation amount is proportional to the tilt angle of the joystick.

The lateral direction operation of the joystick corresponds to the steering amount of a steering wheel. The steering amount is proportional to the tilt angle of the joystick.

When the joystick is tilted farthest in the direction of 1:30, or in other words, tilted farthest in the direction toward the middle of figure one and figure two on the face of a clock, the torque in the forward direction is the largest (e.g., a total torque on the four wheels is 400 Nm), and the turning angle is also the largest (e.g., 60°).

Pinwheeling Mode

The front-back direction operation of the joystick causes No reaction.

The lateral direction operation of the joystick corresponds to the accelerator operation amount. The operation amount is proportional to the tilt angle of the joystick.

When the joystick is tilted farthest in the direction of 3:00 or toward figure three on the face of a clock, the torque required for the vehicle to turn right is the largest (e.g., a total torque on the four wheels is 400 Nm).

Lateral Movement Mode

The front-back direction operation of the joystick causes No reaction.

The lateral direction operation of the joystick corresponds to the accelerator operation amount. The operation amount is proportional to the tilt angle of the joystick.

When the joystick is tilted farthest in the direction of 3:00, the torque for the rightward movement is the largest (e.g., a total torque on the four wheels is 400 Nm).

Figure 2:
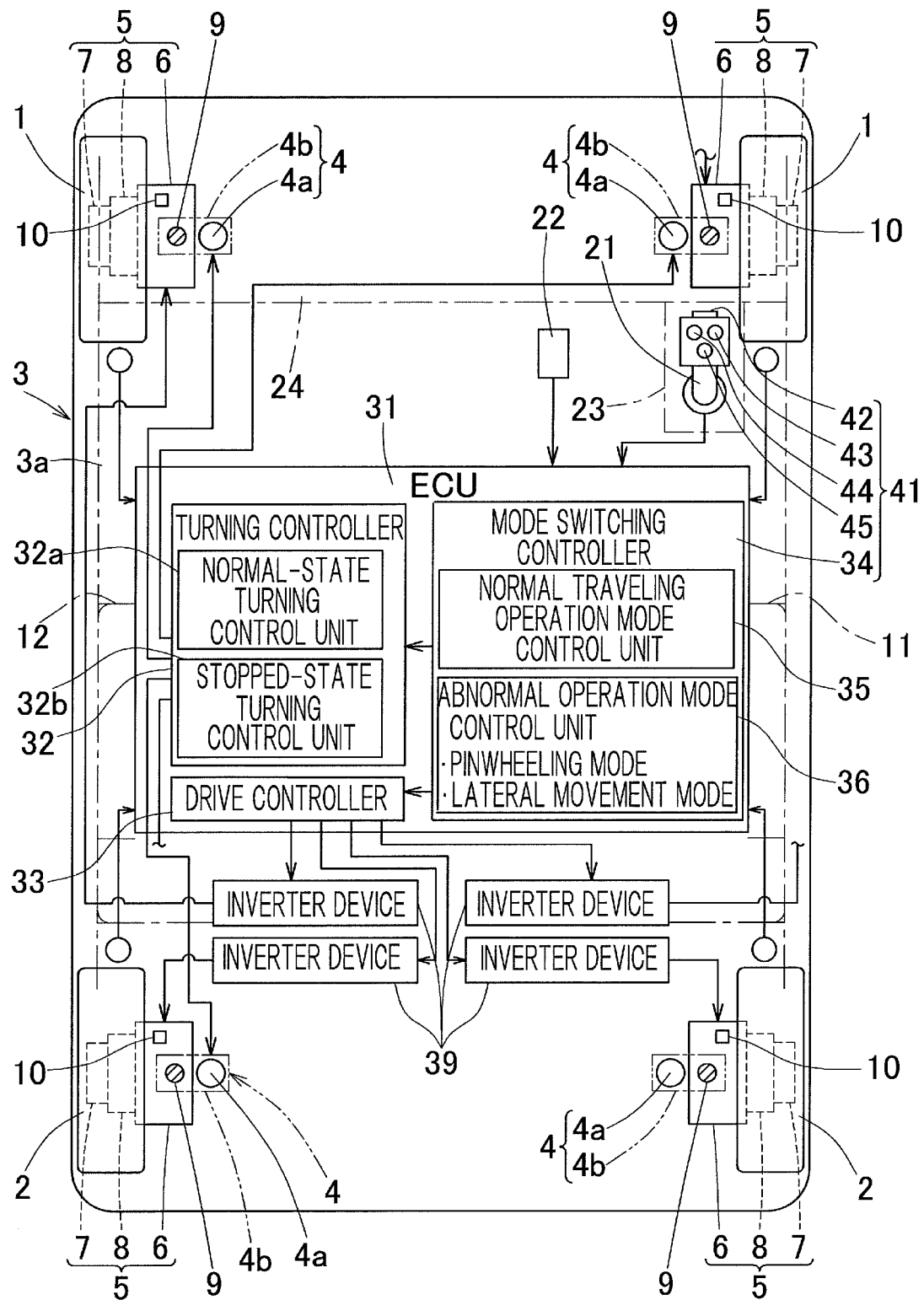
FIG. 2 is an explanatory view in which a block diagram of a control system is shown superimposed on FIG. 1.

In FIG. 2, traveling mode switching device 41 for allowing each of the traveling modes described with reference to FIGS. 3A to 3C to be switched by the operation of the driver is provided (see also FIG. 4). As shown in FIG. 2, the traveling mode switching device 41 includes a plurality of input operation components 42 to 45, and a mode switching controller 34 provided in the ECU 31. Of the input operation components 42 to 45, the first input operation component 42 is providing a switch preparation mode for allowing the operation mode to be switched between a normal traveling operation mode and an abnormal traveling operation mode, and includes an operation button provided on the front surface of the joystick 21. The second to fourth input operation components 43 to 45 are provided for selecting the pinwheeling mode, the lateral movement mode, and the normal traveling mode, respectively, and each includes an operation button provided on the upper surface at the upper end of the joystick 21. At least one of the input operation components 42 to 45 is not necessarily provided on the joystick 21, and may be provided on the surface of a dashboard 24, for example.

The control system will now be described in conjunction with FIG. 2. In a vehicle in which the ECU 31 outputs, to the turning drive source 4a, a turning amount command value having a defined ratio for the steering amount signal inputted via the joystick 21, the stop control device of the vehicle controls the turning operation of the turning device 4.

The ECU 31 and a plurality of inverter devices 39 are provided for controlling the turning device 4 and the traveling drive mechanism 5. The inverter devices 39 drive the motors 6 serving as the electric motors of the traveling drive mechanisms 5 of the wheels, and each includes a power circuit unit such as an inverter to convert DC power of a battery Bt (FIG. 5) to AC power, and a control circuit unit for controlling the power circuit unit according to a command from the ECU 31.

The ECU 31 is an electric control unit or is a vehicle control unit (VCU) for performing central control and cooperative control of the entire automobile, and includes a microcomputer, an electronic circuit and the like. The ECU 31 is an overall control unit for controlling both the turning device 4 and the traveling drive mechanism 5. The ECU 31 may include a plurality of ECUs having different functions, and a collection of the plurality of ECUs is described herein as the ECU 31. The ECU 31 is provided with a turning controller 32, a drive controller 33, and a mode switching controller 34.

The turning controller 32 includes a normal-state turning control unit 32a and a stopped-state turning control unit 32b. The normal-state turning control unit 32a is configured to output, to the turning drive source 4a of each of the turning devices 4, a turning amount command value defined for the steering amount signal inputted from the joystick 21 serving as the steering input device. The "steering amount signal" means a signal representing the steering direction and the magnitude of the steering amount. The "turning amount command value" means a command value representing the drive direction (turning direction) and the magnitude of the turning drive amount (the steering amount) of the turning drive source 4a. The defined turning amount command value may be freely defined. However, in principle, the amount may be appropriately defined, for example, by an actual vehicle test or a simulation so as to satisfy a proportional relation in which the turning amount command value increases as the steering amount signal increases.

When a defined condition is satisfied, the stopped-state turning control unit 32b performs hill hold of the vehicle by controlling the turning device 4 of one or more wheels 1, 2 to turn corresponding one or more wheels 1, 2 toward the toe-in or toe-out side by an amount greater than the turning amount command value from the normal-state turning control unit 32a. An example of the wheels to be turned will be described later. The stopped-state turning control unit 32b detects, as the defined condition, the vehicle speed based on a rotation angle signal outputted from the rotation angle sensor 10, and determines whether the condition that the detected vehicle speed is less than or equal to a first speed threshold and the accelerator input value is less than or equal to an acceleration threshold is satisfied. The accelerator input value in this example means the tilt amount of the lever 21a of the joystick 21 from the neutral position, or in other words, the tilt angle of the joystick 21 in the front-back direction.

In the present embodiment, the vehicle stop control device includes at least the normal-state turning control unit 32a and the stopped-state turning control unit 32b.

The drive controller 33 outputs a drive command such as a torque command to the inverter device 39 of the motor 6 of each of the wheels 1, 2, according to a signal representing the accelerator operation amount inputted via the joystick 21. The signal of the accelerator operation amount includes an acceleration command, a deceleration command, and a speed maintaining command.

The mode switching controller 34 is configured to switch the traveling mode between the normal traveling mode and the abnormal traveling mode by a mode switching signal. In this example, the mode switching controller 34 includes, in addition to the switching function, a normal traveling operation mode control unit 35 and an abnormal operation mode control unit 36 that are configured to cause the turning controller 32 and the drive controller 33 to function according to the respectively corresponding traveling modes. As described above, the mode switching controller 34 and the input operation components 42 to 45 for mode switching constitute the traveling mode switching device 41.

The normal traveling operation mode control unit 35 is configured to cause the turning controller 32 and the drive controller 33 to function normally, or in other words, to perform a defined basic operation, by a signal representing the steering input (i.e., the above-described steering amount) from the joystick 21 serving as the turning and accelerator operation unit and the accelerator operation amount. The basic operation is causing the normal-state turning control unit 32a of the turning controller 32 to give, in response to an input of the steering direction (i.e., according to the steering amount), a command to turn in the input direction, and causing the drive controller 33 to give a drive command according to the accelerator operation amount.

However, even in the normal traveling mode, when the stopped-state turning control unit 32b of the turning controller 32 determines that the defined condition is satisfied, the stopped-state turning control unit 32b performs hill hold of the vehicle by controlling the turning device 4 of one or more wheels 1, 2 to turn corresponding one or more wheels 1, 2 toward the toe-in or toe-out side by an amount greater than the turning amount command value from the normal-state turning control unit 32a.

In the pinwheeling mode, the abnormal operation mode control unit 36 controls the turning controller 32 and the drive controller 33 to effect the pinwheeling mode described with reference to FIG. 3B. Even in the pinwheeling mode, when the stopped-state turning control unit 32b determines that the defined condition is satisfied, the hill hold control by the stopped-state turning control unit 32b is performed. The reason is that the vehicle may rotate when the positions of the center of rotation and the center of gravity are different, although it will not unintendedly move forward or backward.

Although the mode control units 35 and 36 of the mode switching controller 34 determine whether or not to perform the hill hold control in the present embodiment, the present embodiment is not limited to this case. For example, the stopped-state turning control unit 32b may determine whether or not to perform the hill hold control in each of the traveling modes. In this case, the stopped-state turning control unit 32b may not perform the hill hold control only in the pinwheeling mode, for example.

In the lateral movement mode, the abnormal operation mode control unit 36 controls the turning controller 32 and the drive controller 33 to effect the lateral movement mode described with reference to FIG. 3C. However, even in the lateral movement mode, when the stopped-state turning control unit 32b determines that the defined condition is satisfied, the stopped-state turning control unit 32b performs the hill hold control.

Even if the input of the steering direction and the input of the accelerator are performed in the same manner on the joystick 21, the turning controller 32 and the drive controller 33 perform different operations by the intervention of the normal traveling operation mode control unit 35 and the abnormal operation mode control unit 36.

Figure 5:
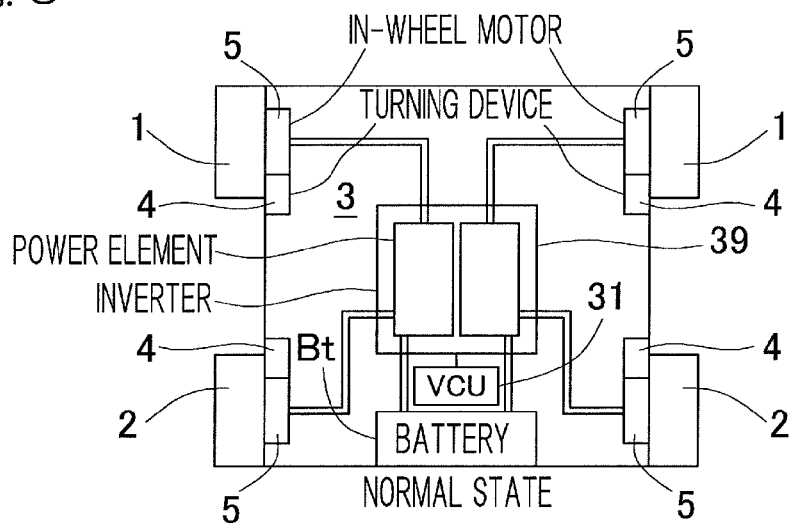
FIG. 5 is an explanatory plan view illustrating a normal state in which no hill hold control is performed on the vehicle.

FIG. 5 is an explanatory plan view illustrating a normal state in which no hill hold is performed on the vehicle. This will be described in conjunction with FIG. 2. In this example, the traveling mode is the normal traveling mode, and the same applies to the following explanatory views. The normal traveling operation mode control unit 35 causes the normal-state turning control unit 32a of the turning controller 32 to give, in response to the steering input from the joystick 21, a command to turn the wheels 1, 2 in the input direction.

Figure 6:
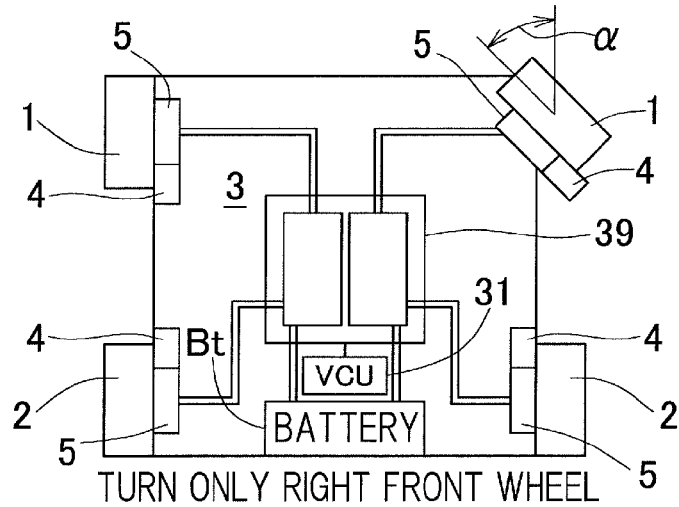
FIG. 6 is an explanatory plan view illustrating a state in which a hill hold control to turn only a right front wheel is performed in the vehicle stop control device.

FIG. 6 is an explanatory plan view illustrating a state in which a hill hold control to turn only the right front wheel 1, for example, is performed in the vehicle stop control device. This will be described in conjunction with FIG. 2. When the stopped-state turning control unit 32b determines that the defined condition is satisfied, the stopped-state turning control unit 32b performs a hill hold control to cause only the turning device 4 of the right front wheel 1 to turn only the right front wheel 1 toward the toe-in side by an amount greater than the turning amount command value from the normal-state turning control unit 32a. By setting the turning angle α of the right front wheel 1 during this hill hold control to be, for example, a toe angle between 30 degrees or more and 75 degrees or less with respect to the front-back direction of the vehicle body 3, hill hold of the vehicle can be performed by using the friction between the turned right wheel 1 and the road surface.

Figure 7:
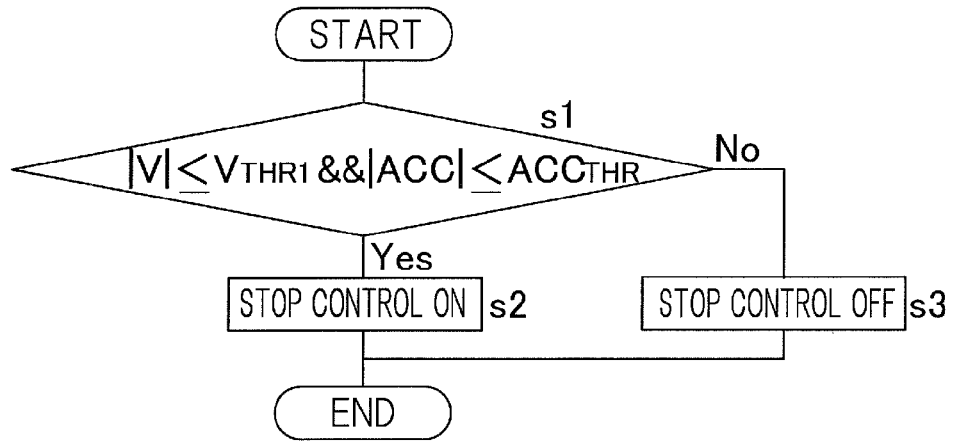
FIG. 7 is a flowchart of a control operation performed by a stopped-state turning control unit in the vehicle stop control device.

FIG. 7 is a flowchart of a control operation performed by the stopped-state turning control unit in the vehicle stop control device. This will be described in conjunction with FIG. 2. The stop control device starts the present processing in the normal traveling mode, the lateral movement mode, or the pinwheeling mode. The stopped-state turning control unit 32b detects a vehicle speed V based on the rotation angle signal outputted from the rotation angle sensor 10, and determines whether the detected vehicle speed V is less than or equal to the first speed threshold $V_{THR1}$ ($|V| \le V_{THR1}$: e.g., the vehicle is in the stoppage state) and the accelerator input value is less than or equal to the acceleration threshold $ACC_{THR}$ ($|ACC| \le ACC_{THR}$: e.g., the accelerator operation amount is "zero") (step s1). When this defined condition is satisfied (step s1: YES), a hill hold control (also referred to as a stop control) to turn the wheels 1, 2 as described above is turned on (step s2). When the above-described condition is not satisfied (step s1: NO), the hill hold control is turned off (step s3). Then, the present processing ends.

The functions and effects will now be described.

Normally, when the driver of the vehicle steers the joystick 21, the normal-state turning control unit 32a outputs a turning amount command value to the turning device 4 for the steering amount signal inputted from the joystick 21.

When the vehicle is stopped, for example, when the vehicle is temporarily stopped on a slope, the stopped-state turning control unit 32b detects the vehicle speed based on the rotation angle signal outputted from the rotation angle sensor 10 of the motor 6. When the detected vehicle speed is less than or equal to the first speed threshold and the accelerator input value is less than or equal to the acceleration threshold, the stopped-state turning control unit 32b causes the turning devices 4 of the wheels 1, 2 to turn the corresponding wheels 1, 2 toward the toe-in or toe-out side by an amount greater than the turning amount command value from the normal-state turning control unit 32a. By using the frictional force between the turned wheels 1, 2 and the road surface, it is possible to prevent unintended backward or forward movement of the vehicle. In this way, the vehicle speed can be detected by using the rotation angle sensor 10 attached to the motor 6, and hill hold of the vehicle can be performed. Accordingly, it is possible to provide a more simplified structure than that of the conventional technique, thus reducing the manufacturing cost. Furthermore, since hill hold of the vehicle can be performed without any operation performed by the driver, it is possible to perform hill hold of the vehicle without relying on the driver's operation or skill, thus achieving improved operability.

Other embodiments will now be described.

Figure 8:
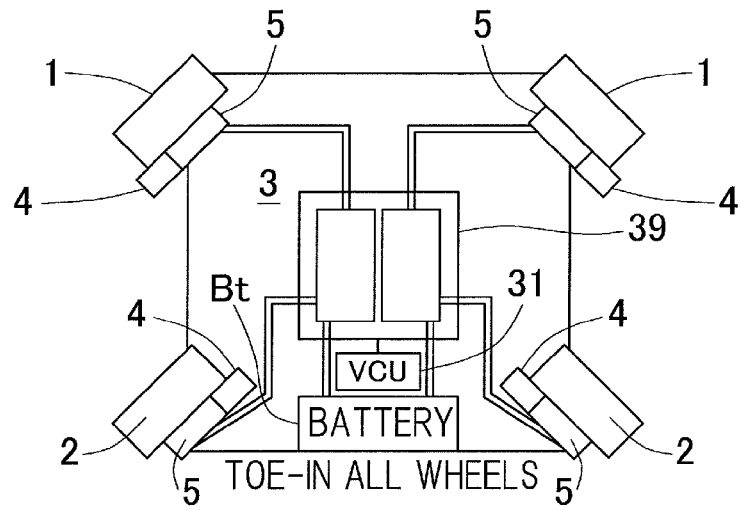
FIG. 8 is an explanatory plan view illustrating a state in which a hill hold control to toe-in all wheels is performed in a vehicle stop control device according to another embodiment of the present invention.

As shown in FIG. 8, the stopped-state turning control unit 32b (FIG. 2) may cause the turning devices 4 of all the wheels 1, 2 to turn the corresponding wheels 1, 2 toward the toe-in or toe-out side (in the example shown in FIG. 8, the toe-in side) by an amount greater than the turning amount command value. In this case, the frictional force between all the wheels 1, 2 and the road surface can be further increased, making it possible to reliably perform hill hold of the vehicle.

Figure 9:
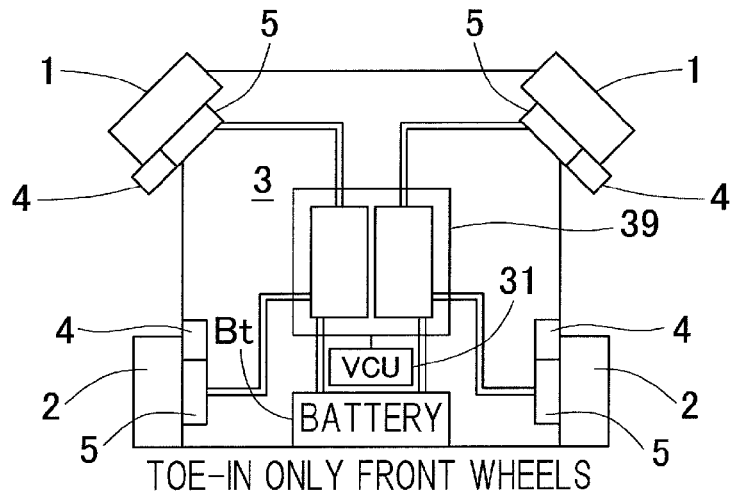
FIG. 9 is an explanatory plan view illustrating a state in which a hill hold control to toe-in only front wheels is performed in a vehicle stop control device according to a yet another embodiment of the present invention.

As shown in FIG. 9, the stopped-state turning control unit 32b (FIG. 2) may causes the turning devices 4, 4 of the front wheels 1, 1 to turn only the front wheels 1, 1 toward the toe-in or toe-out side (in the example shown in FIG. 9, the toe-in side). In this case, the frictional force between the wheels and the road surface can be increased further than when only one of the front wheels 1, 1 is turned, thus making it possible to more reliably perform hill hold of the vehicle.

Figure 10:
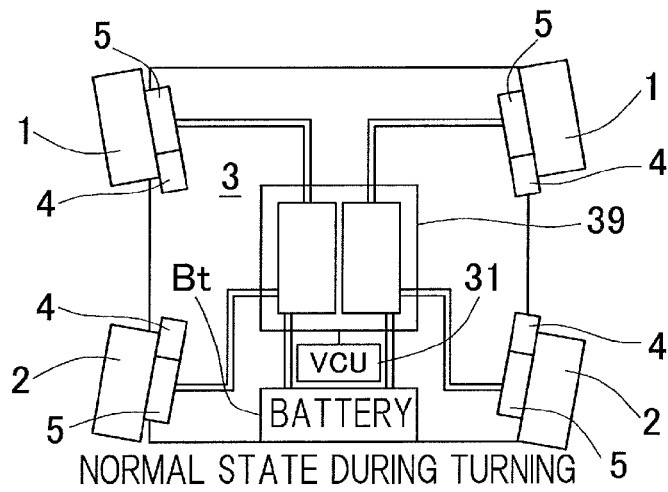
FIG. 10 is an explanatory plan view illustrating a normal state at the time of turning in which no hill hold control is performed on the vehicle.
Figure 11:
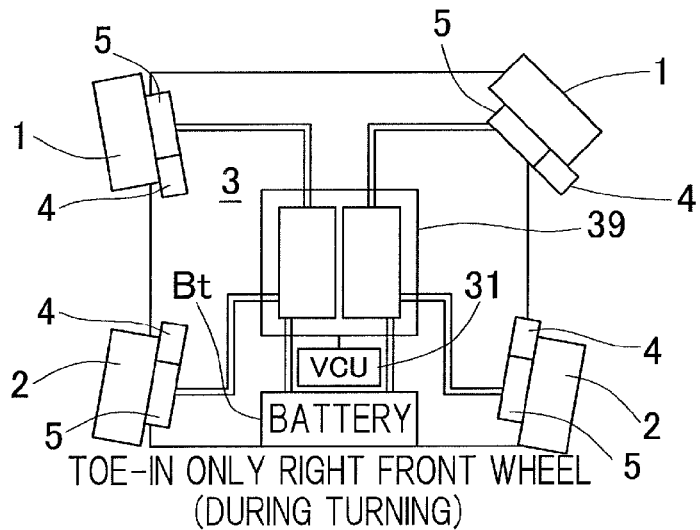
FIG. 11 is an explanatory plan view illustrating a state in which a hill hold control to toe-in only a right front wheel at the time of turning is performed in a vehicle stop control device according to a further embodiment of the present invention.

FIG. 10 is an explanatory plan view illustrating a normal state at the time of turning in which no hill hold control is performed on this vehicle. FIG. 11 is an explanatory plan view illustrating a state in which a hill hold control to toe-in only the right front wheel 1 at the time of turning is performed in a vehicle stop control device according to a yet another embodiment of the present invention. When the stopped-state turning control unit 32b (FIG. 2) determines that the defined condition is satisfied in the normal state at the time of turning to travel in the forward left direction shown in FIG. 10, the stopped-state turning control unit 32b may perform hill hold of the vehicle by turning only the right front wheel 1 farther toward the toe-in side as shown in FIG. 11. The steering amount signal is inputted from the joystick in the normal state at the time of turning shown in FIG. 10, whereas, in the state shown in FIG. 11, the stopped-state turning control unit 32b (FIG. 2) causes the turning device 4 of the right front wheel 1 to turn the right front wheel 1 toward the toe-in side by a greater amount than the turning amount command value defined for that steering amount signal.

Figure 12:
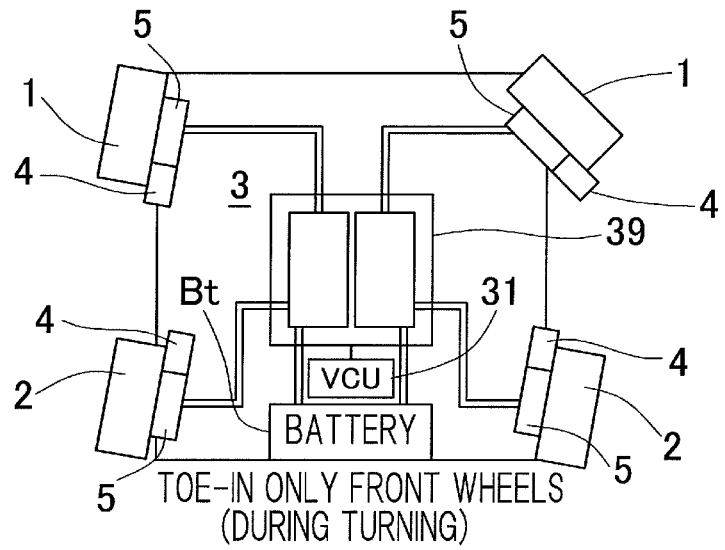
FIG. 12 is an explanatory plan view illustrating a state in which a hill hold control to toe-in only the right front wheel at the time of moving in the forward right direction is performed in a vehicle stop control device according to a still further embodiment of the present invention.

For example, when the vehicle travels in the forward right direction from the normal state at the time of turning as shown in FIG. 12, the stopped-state turning control unit 32b (FIG. 2) may perform hill hold of the vehicle by turning only the right front wheel 1 toward the toe-in side, which should be on the toe-out side, unlike in FIG. 11.

The stopped-state turning control unit 32b (FIG. 2) may cause the turning device 4 to turn the corresponding front wheels 1 and rear wheels 2 such that the toe-in angle or toe-out angle of the front wheels 1 is different from the toe-in angle or toe-out angle of the rear wheels 2, for example, such that the front wheels 1 have a toe angle of +20 degrees and the rear wheels 2 have a toe angle of +10 degrees. For example, the stopped-state turning control unit 32b turns the front wheel 1 toward the toe-in side, and turns the rear wheel 2 toward the toe-out side. Conversely, the stopped-state turning control unit 32b turns the front wheel 1 toward the toe-out side, and turns the rear wheel 2 toward the toe-in side. In these cases, the frictional force between the wheels and the road surface can be further increased than that of the case in that only either the front wheels 1 or the rear wheels 2 are turned, thus making it possible to reliably hill-hold the vehicle.

The stopped-state turning control unit 32b may cause the turning devices 4 of the rear wheels 2 to turn only the rear wheels 2 toward the toe-in or toe-out side.

Figure 13:
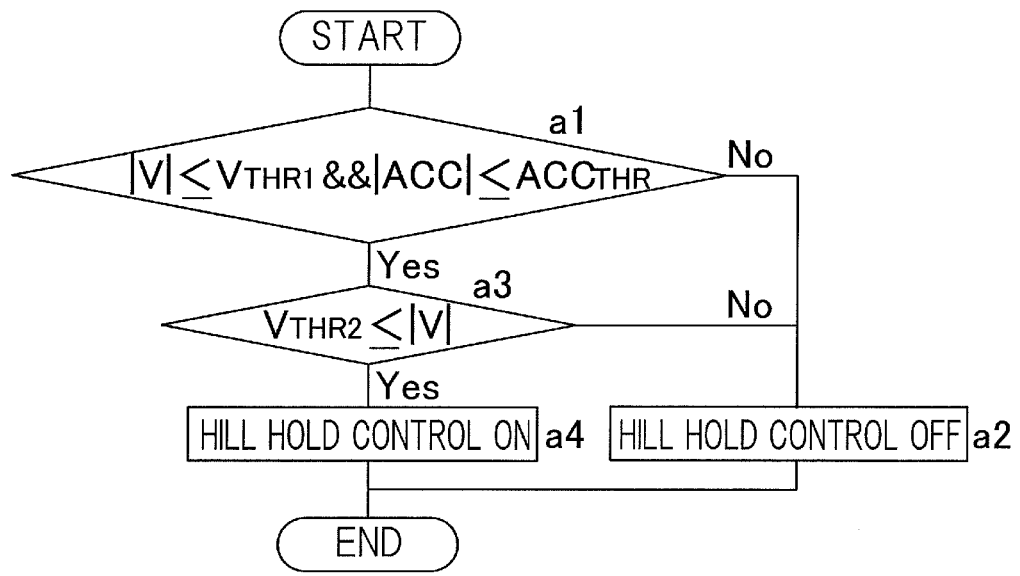
FIG. 13 is a flowchart of the control operation performed by a stopped-state turning control unit in a vehicle stop control device according to a yet still further embodiment of the present invention.

FIG. 13 is a flowchart of a control operation performed by the stopped-state turning control unit 32b in a vehicle stop control device according to a yet still further embodiment of the present invention. The stop control device starts the present processing in the normal traveling mode, the lateral movement mode, or the pinwheeling mode. The stopped-state turning control unit 32b determines whether the detected vehicle speed V is less than or equal to a first threshold $V_{THR1}$ ($|V| \leq V_{THR1}$: e.g., the vehicle is in the stoppage state) and the accelerator input value is less than or equal to the acceleration threshold $ACC_{THR}$ ($|ACC| \leq ACC_{THR}$: e.g., the accelerator operation amount is "zero") (step a1). When the above-described conditions are not satisfied (step a1: NO), the hill hold control is turned off (step a2).

When, after the above-described condition is satisfied (step a1: YES), the stopped-state turning control unit determines that the detected vehicle speed V is greater than or equal to a second speed threshold $V_{THR2}$ ($V_{THR2} \leq |V|$: meaning that the vehicle has started moving unintendedly on a slope, for example) (step a3: YES), the stopped-state turning control unit turns on the hill hold control to turn the wheel as described above (step a4). When it is determined that the detected vehicle speed V is less than the second speed threshold $V_{THR2}$ (step a3: NO), the processing proceeds to step a2. Then, the processing ends.

The effectiveness of avoiding unintended movement of the vehicle can be increased by performing the hill hold control when the vehicle speed is greater than or equal to the second speed threshold in this way after a first condition that the vehicle speed is less than or equal to the first speed threshold and the accelerator input value is less than or equal to the acceleration threshold is satisfied, rather than by performing the hill hold control under the first condition.

While performing hill hold of the vehicle, the stopped-state turning control unit 32b may display an indication to that effect on a display device of the vehicle. By seeing the indication displayed on the display device, the driver or the like can recognize that the vehicle is under the hill hold control.

The vehicle stop control device may be provided with a switch for releasing hill hold of the vehicle performed by the stopped-state turning control unit 32b. For example, the driver can forcibly release hill hold of the vehicle by using the switch according to his or her preference or the like, thereby smoothly starting the vehicle without delay from the stopped state of the vehicle. The driven wheels may be driven to travel by an onboard drive device including the motor 6.

A steering wheel, or a known accelerator pedal or the like provided on the floor in front of the driver's seat 11 may be used as the steering input device for operating the turning device 4.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope of the invention.

REFERENCE NUMERALS 1, 2 . . . wheel
4 . . . turning device
5 . . . traveling drive mechanism (in-wheel motor drive device)
6 . . . motor
10 . . . rotation angle sensor
21 . . . joystick (steering input device)
32a . . . normal-state turning control unit
32b . . . stopped-state turning control unit

What is claimed is:

1. A vehicle stop control device for a vehicle including four or more wheels and turning devices respectively provided in all of the wheels so as to allow independent turning of the wheels, the wheels including driven wheels being driven to travel by corresponding independent motors, the motors each having a rotation angle sensor to output a rotation angle signal, the vehicle stop control device comprising:

a normal-state turning control unit configured to output, to the turning devices, a turning amount command value defined by a steering amount signal inputted from a steering input device to input steering angles of the wheels; and a stopped-state turning control unit configured to detect a vehicle speed based on the rotation angle signal outputted from the rotation angle sensor, and configured to, when the detected vehicle speed is less than or equal to a first speed threshold and an accelerator input value is less than or equal to an acceleration threshold, perform hill hold of the vehicle with the turning device of one or more of the wheels turning the corresponding wheel toward a toe-in or toe-out side by an amount greater than the turning amount command value from the normal-state turning control unit.

2. The vehicle stop control device as claimed in claim 1, wherein the steering input device is a joystick or a steering wheel.

3. The vehicle stop control device as claimed in claim 1, wherein the stopped-state turning control unit causes the turning devices to turn the corresponding wheel such that a toe-in angle or a toe-out angle of front wheels and a toe-in angle or a toe-out angle of rear wheels are different from each other.

4. The vehicle stop control device as claimed in claim 1, wherein the stopped-state turning control unit turns a right front one of the wheels toward the toe-in side when the vehicle travels in a forward right direction, and turns a left front one of the wheels toward the toe-in side when the vehicle travels in a forward left direction.

5. The vehicle stop control device as claimed in claim 1, wherein the stopped-state turning control unit detects the vehicle speed based on the rotation angle signal outputted from the rotation angle sensor, and, when the vehicle speed has become greater than or equal to a second threshold after the detected vehicle speed is determined to be less than or equal to the first speed threshold and the accelerator input value is determined to be less than or equal to the acceleration threshold, performs hill hold of the vehicle with the turning device of one or more of the wheels turning the corresponding wheel toward the toe-in or toe-out side by the amount greater than the turning amount command value from the normal-state turning control unit.

6. The vehicle stop control device as claimed in claim 1, wherein the driven wheels are driven to travel by in-wheel motor drive devices including the motors.

* * * * *